United States Patent [19]
Heller

[11] 3,762,797
[45] Oct. 2, 1973

[54] ADJUSTABLE SUPPORT FOR OPTICAL OBSERVATION INSTRUMENT

[75] Inventor: Rudolf Heller, Zurich, Switzerland

[73] Assignee: Contraves AG, Zurich, Switzerland

[22] Filed: May 25, 1972

[21] Appl. No.: 256,813

Related U.S. Application Data

[63] Continuation-in-part of Ser. No. 188,933, Oct. 13, 1971.

[30] Foreign Application Priority Data
Jan. 14, 1971   Switzerland............................ 531/71
July 9, 1971    Switzerland........................ 10099/71

[52] U.S. Cl. .................................................. 350/85
[51] Int. Cl. ............................................ G02b 23/16
[58] Field of Search .................................. 350/82–85

[56] References Cited
UNITED STATES PATENTS
3,475,075   10/1969   Stone .................................... 350/85
2,651,560   9/1953    Gerber .................................. 350/85

FOREIGN PATENTS OR APPLICATIONS
1,901,180   11/1969   Germany ............................. 350/85

Primary Examiner—David H. Rubin
Attorney—Werner W. Kleeman

[57] ABSTRACT

An adjustable stand for an optical observation instrument, especially for a binocular microscope, the position and/or orientation of which can be adjusted and fixed in a spatial area. A three-axis full Cardan rod assembly connects the observation instrument with a freely adjustable terminal piece of a pivot rod assembly. The Cardan rod assembly and the pivot rod assembly incorporating a number of bearing means each providing single-axis pivot joints, and each of said bearing means is formed of relatively frictionless roller body bearings. Each of the number of roller body bearings incorporating a respective electrically operable blocking mechanism which can be selectively electrically switched-in and switched-out in such a manner that the observation instrument can be selectively fixed and adjusted, respectively, in each desired orientational position. Operating means render possible a freely combined rotational movement of the three-axis full Cardan rod assembly about three axial directions which are perpendicular to one another, said operating means comprising a forehead support and a mouthpiece by means of which the electrical blocking mechanisms can be selectively released or fixed.

3 Claims, 4 Drawing Figures

I # ADJUSTABLE SUPPORT FOR OPTICAL OBSERVATION INSTRUMENT

CROSS-REFERENCE TO RELATED CASE

The present application is a continuation-in-part application of my copending commonly assigned United States application, Ser. No. 188,933, filed October 13, 1971 and entitled "Adjustable Support Or Stand For An Optical Observation Instrument".

BACKGROUND OF THE INVENTION

The present invention relates to a new and improved adjustable support or stand for an optical observation instrument.

The support or stand of this invention can be, for instance, used in conjunction with a telescope, binoculars, a camera, also for instance a TV-camera. However, according to a preferred environment of use, the invention is directed to a support or stand for a binocular microscope, as such can be employed for manufacturing or assembling precision mechanical, optical or electrical components, but also for carrying out surgical operations, especially brain surgery. During such use of observation instruments, the requirement exists of providing a support or stand, by means of which the observation instrument or device can be quickly and sufficiently selectively accurately oriented and appropriately brought into visual alignment with each localized zone or region of a larger area. Upon reaching the desired position and/or orientation the observation device must be able to be fixed in such selected position.

It should be recognized that especially when performing brain surgery, the surgeon is particularly dependent upon an observation device embodying a binocular microscope which he can adjust at a location which is not disturbing to him into a position for viewing the operation zone. He then uses such binocular microscope for the microscopic observation of certain regions of the operating zone. Furthermore, the surgeon should be able to quickly and positively adjust the binocular microscope into the desired effective position so as to be an aid to him in carrying out incisions and surgical manipulations.

In the environment of use under discussion it is of course desirable that the optical observation device should be capable of adjustment as easily as magnifying glasses or binoculars which are simply held by hand of the user, but must be capable of being fixed in every selected position.

SUMMARY OF THE INVENTION

Hence, a significant object of this invention relates to a novel construction of adjustable support or stand for an optical observation instrument wherein the positional adjustment of the observation instrument can be carried out quickly and easily in a most reliable and rapid fashion.

A further object of this invention relates to an improved adjustable stand for support for an optical observation instrument which allows for proper positioning or adjustment of the instrument quickly and reliably in an extremely simple and positive fashion.

Now in my aforementioned copending United States application, Ser. No. 188,933, there is disclosed an adjustable stand or support for an optical observation instrument, preferably a binocular microscope, the position and/or orientation of which can be freely adjusted and fixed within a desired spatial area. The observation instrument is secured through the agency of a three-axis full Cardan rod assembly with a spasially freely adjustable terminal piece of a pivot rod assembly mounted in a stationary support. The free combined rotations of the full Cardan rod assembly about three axial directions which are perpendicular to one another can occur through the agency of a handgrip. All of the pivot joints are single-axis and constructed as relatively frictionless roller body bearings. A plurality of the roller body bearings are associated with a respective electrical blocking mechanism which can be switched-in and switched-out and the roller body bearings cooperate with such blocking mechanisms in such a manner that by actuating a switch, preferably at the handgrip of the observation instrument, the observation instrument can be fixed in its attained position and/or orientation or for adjustment purposes can be released.

Now in accordance with the specific subject matter of this development the adjustable stand for the optical observation instrument of the aforementioned type is manifested by the features that for spatially adjusting such observation instrument there is additionally provided thereat a forehead support and a mouthpiece switch by means of which the electrically switchable blocking mechanisms can be selectively released or fixed.

It has been found when using such type observation instrument, especially when carrying out delicate surgical operations, at least the adjustment of certain regions or sections of the operating zone can be advantageously carried out without having to resort to the use of any hand or manual operations.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENT

Figure 1:
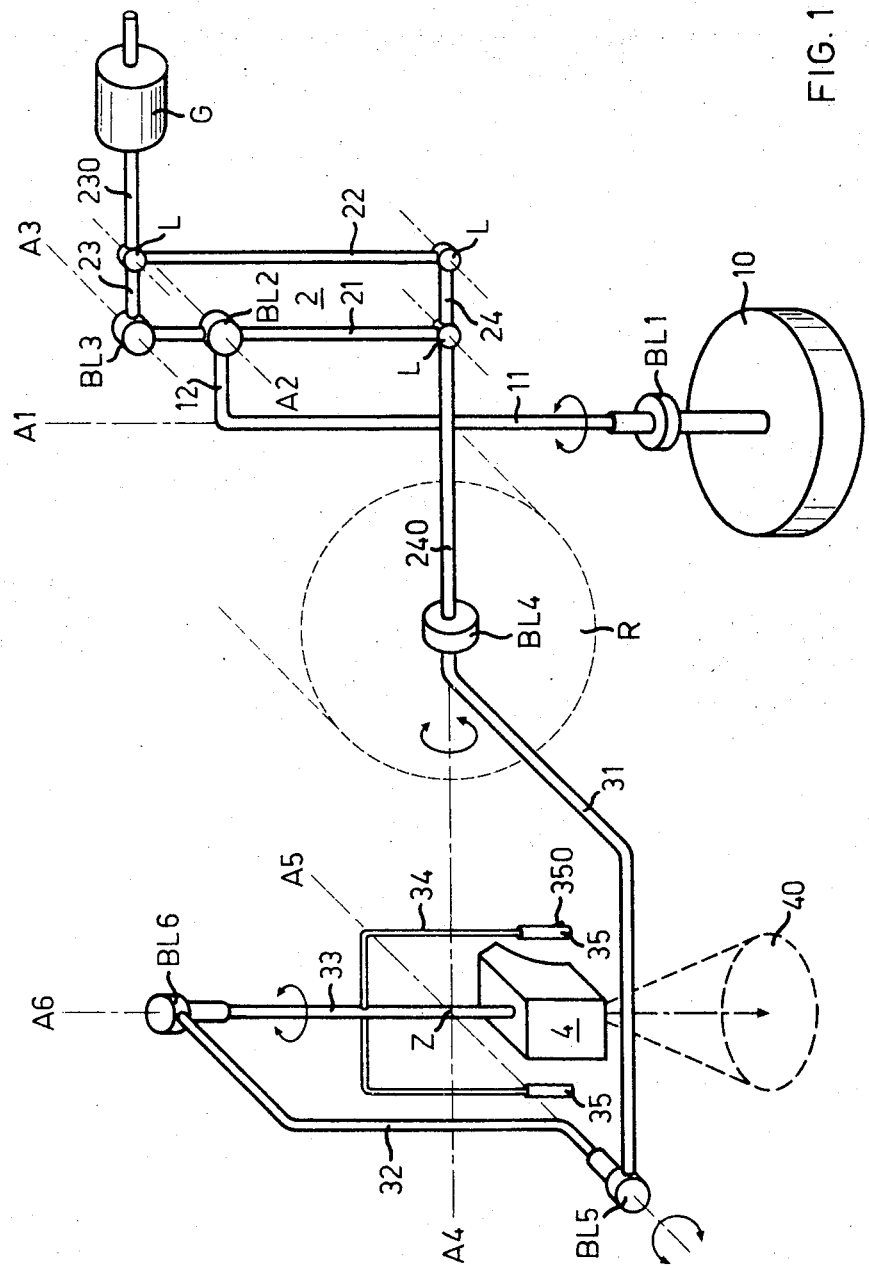
FIG. 1 is a schematic perspective view of the entire support or stand for an observation instrument or device.
Figure 2:
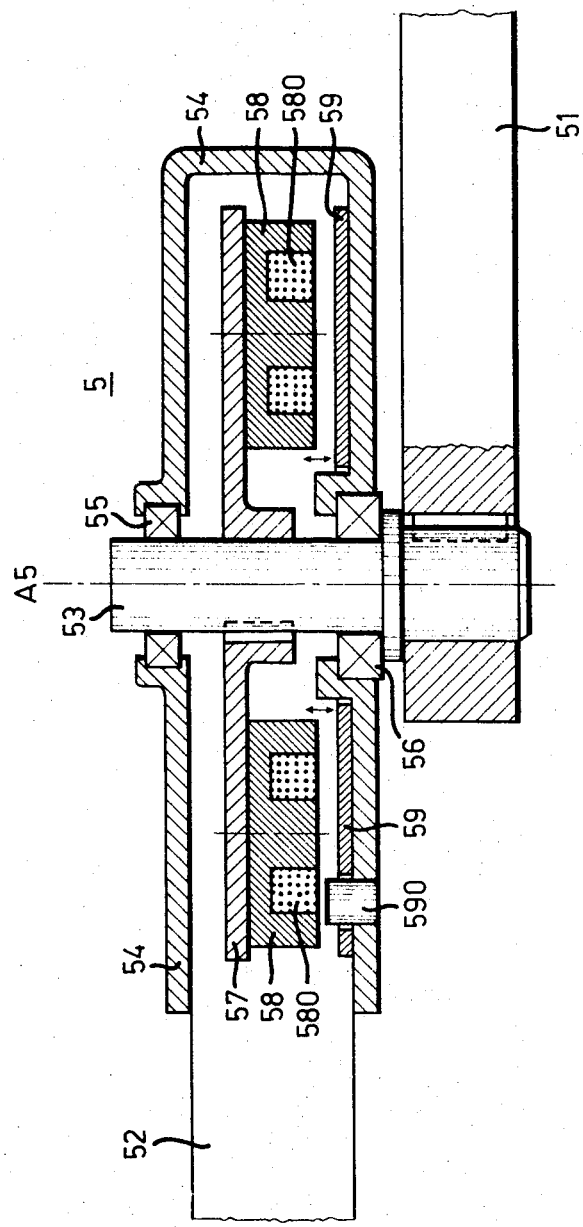
FIG. 2 is an enlarged sectional view of an electromagnetically blockable rotatable mount or bearing arrangement for two lever arms.
Figure 3:
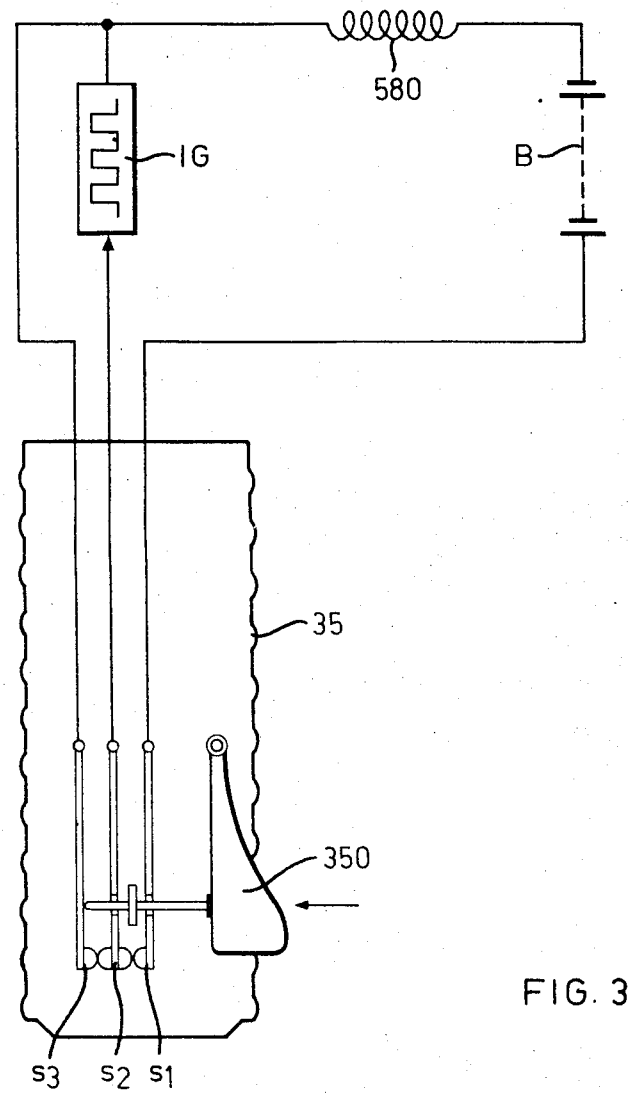
FIG. 3 is a circuit diagram suitable for actuating the bearing blocking arrangement.

Prior to considering the drawings in detail, it is mentioned that for purposes of providing a clear understanding of the invention there is illustrated in FIGS. 1 to 3 inclusive the subject matter of the adjustable support or stand constituting subject matter of my previously mentioned copending United States application, Ser. No. 188,933, which will be described fully herein so as to have a complete understanding of the inventive development, the details of which will be considered in conjunction with the showing of FIG. 4. Hence, describing now the drawings, in FIG. 1 there is shown a preferred construction of adjustable support or stand for an optical observation instrument, wherein at a stationary pedestal or support 10 there is rotatably mounted a stand column or upright 11 for rotation about its vertical axis A1. The associated bearing or mount BL1 is constituted by a single-axis roller body bearing having an electro-magnetically actuatable blocking mechanism. Details of a possible contruction of such type blockable bearing are illustrated in FIG. 2 of the drawings and will be considered more fully hereinafter.

Now at the end of a transversely extending arm 12 of the column 11 there is mounted a second blockable or lockable rotary bearing BL2, here shown oriented in a substantially horizontally extending axial direction A2, but which however is rotatable about the vertical axis A1. Now at this bearing BL2 there is pivotably mounted for movement about the axis A2 one rod 21 of a linkage parallelogram guide arrangement 2. The other rods of the linkage parallelogram 2 are designated by reference characters 22, 23 and 24. Now of the four connection joints of this linkage parallelogram 2 formed of the rods 21, 22, 23 and 24, and wherein the connection or hinge joints are each oriented in the direction of the axes $A_2$ and $A_3$ respectively, the one pivot or hinge joint connection BL3 is likewise blockable, whereas the others, each designated by reference character L, are not lockable or blockable.

Now at an extension 230 of the linkage parallelogram rod or lever 23 there is mounted a balancing weight G which can be adjusted in such a fashion that the moment of rotation of the center of gravity of all movably mounted stand components can be balanced out or equalized with regard to the axis $A_2$ of the rotary bearing means BL2.

Continuing, it will be observed that at an extension 240 of the parallelogram rod or lever 24 there is arranged a further blockable rotary bearing means BL4, oriented in the direction of the lengthwise axis $A_4$ of such rod 24. This bearing means BL4 is adjustable at each point of a spatial zone or area R shown in phantom lines in FIG. 1, and circularly surrounding the stand column 11, with the orientation of axis $A_4$ being functionally dependent upon the achieved location.

One end of a Cardan-partial frame or support 31 is rotatably mounted at the bearing BL4 for rotation about its axis A4. The other end of this partial support 31 carries a blockable or lockable rotary bearing means BL5, the axis A5 of which is arranged so as to be always perpendicular to the axis A4 and intersects same. The one end of a second Cardan-partial support or frame 32 is rotatably mounted for movement about its axis A5 at the bearing means BL5, and at the other end thereof there is arranged a blockable rotary bearing means BL6 in such a way that its axis of rotation A6 is always directed towards the point of intersection Z of the axes A4 and A5 or the rotary bearings BL4 and BL5 respectively.

Now, coaxially mounted for rotation at the rotary bearing means BL6 is a carrier or support rod 33 for the optical instrument or device 4, preferably here considered to be a binocular microscope. This support rod 33 is fixedly connected with a handle or bracket 34, at the ends of which there are formed or otherwise provided two handgrips 35. At one of these handgrips 35 there is arranged a deblocking or release switch 350 which acts upon the blocking mechanisms of all of the bearing means BL1, BL2, BL3, BL4, BL5 and BL6.

Through the agency of this deblocking switch 350 it is possible to release the blocking mechanisms of all of these bearing means for the purpose of adjusting the binocular microscope 4 throughout all of its possible degrees of freedom of movement.

The binocular microscope 4 is adjustable at its support rod 33 in such a manner that all of the gravitational moments of rotation of the three-axes full Cardan joint arrangement or assembly 31, 32, 33 can be equalized or balanced out with respect to its three rotational axis A4, A5, A6, and specifically in such a manner that the common center of gravity of the components supported at the bearing means BL4 comes to lie at the point of intersection Z of all of these three axes.

On the otherhand, through the agency of non-illustrated telescoping or extension devices or compensating weights it is possible to adjust the balancing weight G at the parallelogram rod 23 in such a manner that the center of gravity of all of the components movably supported at the bearing means BL2 of the entire stand or support comes to lie at the axis A2 of this bearing. In this way the binocular microscope 4 only adjusts itself under the influence of external adjustment forces even upon release of all of the bearing blocking devices, and which external adjustment forces only bring about an acceleration of the masses and need only overcome the frictional forces prevailing at the bearing means.

By virtue of this construction and arrangement, the observer, i.e., the assumed surgeon, can readily and easily adjust the binocular microscope 4, through the agency of the handgrips 35, while actuating the deblocking switch means 350, in a direct and intended manner throughout every desired orientation and for each desired point of a spatial work area or region. Further, upon releasing the deblocking switch means 350 the instrument i.e., microscope 4 is then blocked in the previously obtained adjusted position. In the event that the microscope is provided in known manner with a device for illuminating an image field 40, then, location or determination of the desired adjustments are facilitated.

It would, of course, be possible and it is within the framework of the teachings of this invention, to replace the illustrated linkage parallelogram by many other different types of parallelogram guide arrangements having an analogous mode of operation.

In FIG. 2 there is illustrated an embodiment of brake bearing means BL of the type employed a number of times in different sizes in the arrangement of FIG. 1 as such has been explained above, and which has been designated in its entirety by reference character 5. This brake bearing means, after having been deblocked or released, serves to pivot both of the levers 51 and 52 relative to one another and about their connection axis A5.

The pivot pin or shaft 53 is suitably rigidly connected for rotation with the lever 51. A combination brake and bearing housing 54 rigidly connected with the other lever 52 is rotatably mounted at the shaft journal or pin 53 through the agency of both roller body bearings 55 and 56. A support disc 57 for one or a number of electromagnets 58 with therein mounted electrical coils 580 is rigidly mounted for rotation at the shaft journal 53. A brake disc 59 is rigidly connected for rotation with the housing 54 through the agency of the entrainment or mixing pins 590, but which is still axially displaceable, is situated opposite the electromagnets 58. During current flow through the magnet coils 580 the movable brake disc 59 is attracted against the electromagnets 58, and thereby blocks each rotational movement of the lever 52 relative to the lever 51.

Now in FIG. 3 there is illustrated by way of example a circuit diagram of circuitry suitable for the deblocking or release of the bearing means BL shown in FIG. 2. Upon pressing the actuating or switching button 350 mounted at the handgrip 35 the contact $s_3$ is open during the first phase, so that the magnetic coils 580 are no longer continuously disposed at the working current circuit of the battery B, rather now only intermittently through the agency of the pulse transmitter IG. Consequently, the bearing BL which is equipped with the blocking mechanisms of the type shown in FIG. 2 is now only intermittently released for the fine adjustment of the binocular microscope 4. When completely depressing the button or knob 350 the contact $s_2$ is also raised from the contact $s_1$ so that the coils 580 are now continuously without current and all adjustment movements of the microscope can be freely carried out without hindrance. Upon release of the switching button 350 the bearing means are again blocked.

Figure 4:
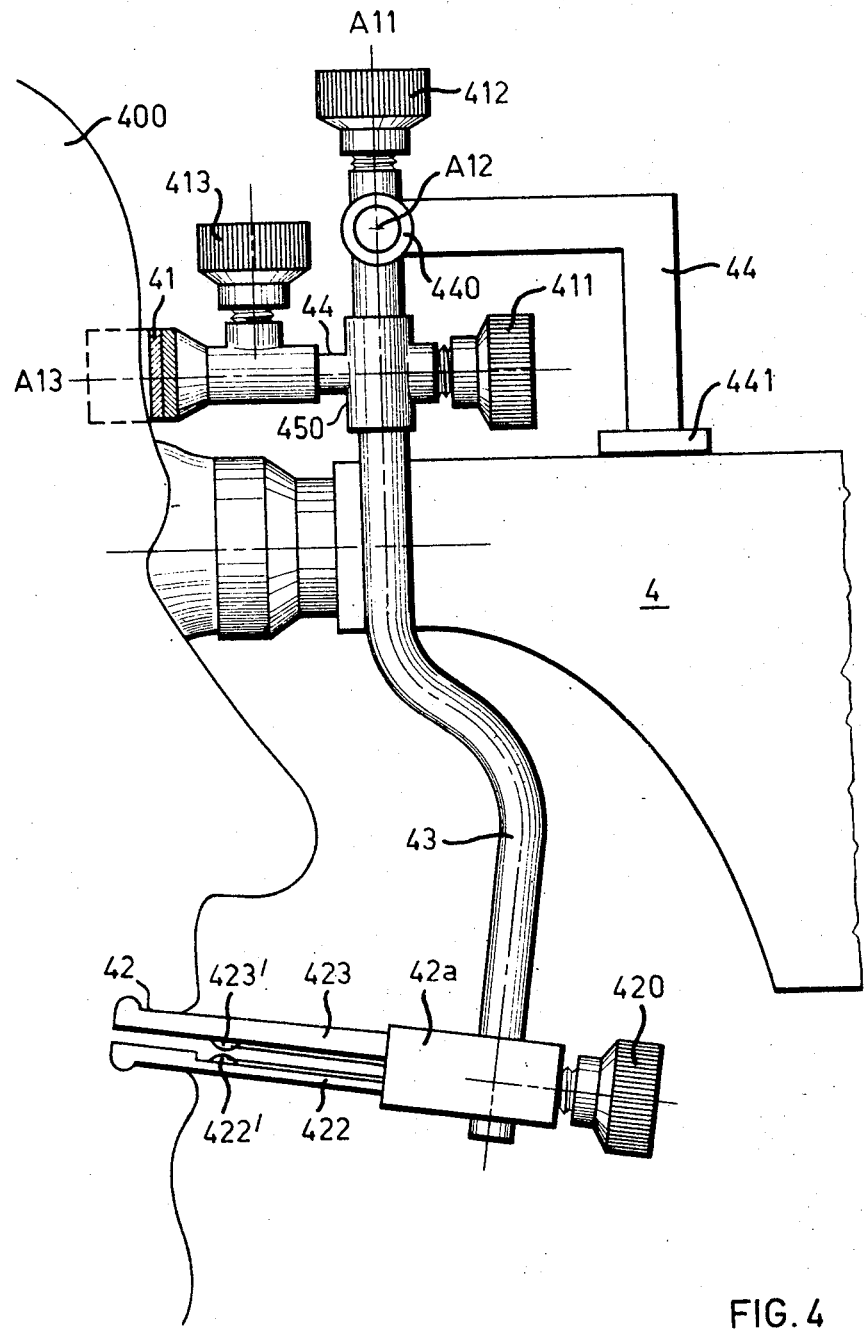
FIG. 4 is a sechmatic view of an embodiment of inventive mouth bar or clamp used as an aid for adjusting the binocular microscope and equipped with a deblocking switch.

FIG. 4 of the drawing illustrates the arrangement of this development wherein a mouthpiece or mouth bar 42 which can be used as an adjustment element aid for the binocular microscope 4 and containing mounted thereat a deblocking switch 42a as well as a forehead support 41 cooperating therewith. The support arrangement for the mouthpiece 42 and the forehead support 41 for the observer 400 are secured to the optical microscope 4 by means of the support means 441. A shaft 43 is mounted for rotation about the axis A12 of the support roller pin 440 secured to the support means 44 and such shaft 43 is also suitably axially displaceably mounted, for instance in the sleeve 450. The forehead support 41 is arranged at the associated shafts 43 and 44 so as to be likewise rotatable about the axes A11 and A13 and also to be axially displaceable. The mouthpiece 42 is rotatoably and axially displaceably arranged at the shaft 43. In order to fix the mouthpiece 42 and the forehead support 41 in the desired position there are advantageously provided fixing or adjustment screws 411, 412, 413 and 420.

Contacts 422' and 423' serving as switch components are arranged between two resilient mouthpiece components or portions 422 and 423 and which can be pressed together by a biting action exerted by the user upon the mouthpiece 42 against a resilient restoring force. These contacts 422' and 423' serving as the switch components together with the actuating or deblocking switch 350 (FIG. 3) mounted at the handgrip 35 (FIG. 1) form parallely connected deblocking switch means.

Upon biting together both mouthpiece portions 422 and 423 of the switch 42 the bearing blocking action at the stand is released and the observer 400 can directly and intentionally adjust, for every desired orientation and with regard to any desired point of his spatial activity, the observation device 4 in cooperation with the forehead support 41 and the mouthpiece switch 42. After reaching the desired position the pressure exerted upon both of the resilient switch components 422 and 423 is released and therefore the blocking condition of the stand bearings is again established.

While there is shown and described present preferred embodiments of the invention, it is to be distinctly understood that the invention is not limited thereto but may be otherwise variously embodied and practiced within the scope of the following claims.

What is claimed is:

1. An adjustable stand for an optical observation instrument, especially for a binocular microscope, the position and/or orientation of which can be adjusted and fixed in a spatial area, comprising an observation instrument, a pivot rod assembly incorporating a terminal piece spatially freely adjustable through a combination of rotational movements, a stationary support for mounting said pivot rod assembly, a three-axis full Cardan rod assembly for connecting said observation instrument with said freely adjustable terminal piece of said pivot rod assembly, said Cardan rod assembly and said pivot rod assembly incorporating a number of bearing means each providing single-axis pivot joints, each of said bearing means being formed of relatively frictionless roller body bearings, each of said number of roller body bearings incorporating a respective electrically operable blocking mechanism which can be selectively electrically switched-in and switched-out in such a manner that the observation instrument can be selectively fixed and adjusted, respectively, in each desired orientational position, and operating means for rendering possible the freely combined rotational movement of said three-axis full Cardan rod assembly about three axial directions which are perpendicular to one another, said operating means comprising a forehead support and a mouthpiece by means of which said electrical blocking mechanisms can be selectively released or fixed.

2. The adjustable stand as defined in claim 1, wherein said mouthpiece incorporates deblocking means actuated by biting down upon said mouthpiece.

3. The adjustable stand as defined in claim 1, wherein said forehead support for the operator is secured along with the mouthpiece of the observation instrument.

* * * * *